United States Patent [19]
Iida
[11] 3,735,369
[45] May 22, 1973

[54] MAGNETIC MEMORY EMPLOYING FORCE DETECTING ELEMENT

[76] Inventor: Shuichi Iida, No. 23-11-4-chome, Funabashi, Setagaya-ku, Tokyo, Japan

[22] Filed: Sept. 24, 1970

[21] Appl. No.: 75,102

[30] Foreign Application Priority Data

Oct. 2, 1969 Japan ................................44/78794

[52] U.S. Cl. ..........340/174 R, 340/147 TF, 307/309, 310/8.7

[51] Int. Cl. ............................................G11c 11/02

[58] Field of Search ................340/174 MS, 174 R, 340/174 TW, 174 VB, 174 TF; 307/308, 309; 324/43; 310/26, 8.7; 179/100.2 CH

[56] References Cited

UNITED STATES PATENTS

| | | | |
|---|---|---|---|
| 3,434,119 | 3/1969 | Onyshkevych | 340/174 VB |
| 3,083,353 | 3/1963 | Bobeck | 340/174 TW |
| 3,537,305 | 11/1970 | Rindner et al. | 307/308 X |

OTHER PUBLICATIONS

Electronics Letters, "Piezomagnetostrictive Memory Element" 11/67, Vol. 3, No. 11; p. 496–498.

*Primary Examiner*—Stanley M. Urynowicz, Jr.
*Attorney*—Clario Ceccon

[57] ABSTRACT

This invention relates to a memory device using a magnetized ferromagnetic element of an arbitrary shape, a current path penetrating through or closely contacting said element and a force-detecting means which detects a force $\vec{F}$, resulting from said ferromagnetic element when a current flows through said path and being represented by $$\vec{F}=\vec{F}_1+\vec{F}_2=\int[(-\nabla\cdot\vec{M})\vec{H}_I+(\vec{i}/c)\times\vec{H}']dv \quad (1)$$

where $\vec{M}$ is the magnetization
$\vec{i}$ is the current density
$\vec{H}$ is the total magnetic field
$\vec{H}_I$ is the magnetic field produced by the current $i$
$\vec{H}'$ is the magnetic field obtained from the total field $\vec{H}$ by subtracting $\vec{H}_I$ ($\vec{H}'=\vec{H}-\vec{H}_I$)
$c$ is the light velocity.

5 Claims, 6 Drawing Figures

MAGNETIC MEMORY EMPLOYING FORCE DETECTING ELEMENT

This invention relates to a memory element, particularly to a super-high-speed magnetic memory element having a non-destructive read-out function due to dynamic interaction between the electric current and the magnetization.

Ferrite cores of permalloy thin films having a square hysteresis loop have been used for magnetic memory elements of the electronic computer.

In the prior art, the magnetic field is produced by pulses of electric current applied to the magnetic element. The magnetization of the magnetic element is altered from one site on the magnetic hysteresis curve to another site and this alteration of magnetic remanences is utilized for writing or storing into the memory element. When reading out, the magnetization of the magnetic element is changed on the hysteresis loop by changing the magnetic field using to pulses of electric current. An electromotive force is induced with the change of the magnetization, and readout is carried out by detecting the induced electromotive force. Therefore, the magnetization is changed or destroyed by the reading out, and continuous or successive operation cannot be done. In order to avoid this defect, or to fix the magnetization upon reading out, a re-writing operation is necessary.

It may be possible to utilize the Hall voltage of a semiconductive ferromagnetic element for the purpose of non-destructive readout of the magnetic element, but the ferromagnetic semiconductor capable of inducing sufficient Hall voltage has not been found.

It is well-known that when electric current flows through a magnetic element which has been magnetized, the magnetic element receives a force, but the detailed mechanism has never been studied and nobody has thought to utilize this phenomena for the reading out of a magnetic memory.

This invention is based on the analysis of this phenomena, and the principle of this invention is as follows;

A force is generally divided into two parts, that is,

1. A force $\vec{F}_1$ derived from the action of the magnetic field (including magnetic flux density) to the magnetic moment;

$$\vec{F}_1 = \int [(-\nabla\cdot\vec{M})\,\vec{H} + \vec{M} \times (-\nabla \times \vec{H})]dv \quad (2)$$

2. A force $\vec{F}_2$ derived from the action of the magnetic field (including magnetic flux density) to the electric current;

$$\vec{F}_2 = \int (\vec{i}/c) \times \vec{B}\,dv \quad (3)$$

Although $\vec{H}$ and $\vec{B}$ are not microscopically uniform and not equal to macroscopic $\vec{H}$ and $\vec{B}$, the combined force $(\vec{F}_1 + \vec{F}_2)$ is not affected by the microscopic change of $\vec{H}$ and $\vec{B}$, and hence $\vec{H}$ and $\vec{B}$ are hereinafter regarded as macroscopic $\vec{H}$ and $\vec{B}$.

$\vec{H}$ and $\vec{B}$ are given by the following equations;

$$\vec{H} = \vec{H}ext + \vec{H}dem + \vec{H}_I \quad (4)$$

$$\vec{B} = \vec{H}ext + \vec{H}dem + \vec{H}_I + 4\pi M \quad (5)$$

Where $\vec{M}$ is the magnetization, $\vec{H}$ is the magnetic field, $\vec{B}$ is the magnetic flux density, $\vec{H}ext$ is the external magnetic field, $\vec{H}dem$ is the demagnetizing field produced by the magnetic element itself, $\vec{H}_I$ is the magnetic field produced by the electric current, $c$ is the light velocity and $\vec{i}$ is the current density.

Mathematical combination of equations (2) and (3) for $F_1$ and $F_2$ produces:

$$\vec{F} = \vec{F}_1 + \vec{F}_2 = \int [(-\nabla\cdot\vec{M})\,\vec{H}_I + (\vec{i}/c) \times (\vec{H}ext + \vec{H}dem)]dv \quad (6)$$

In the right hand of this equation, the first term represents the force which the magnetic field produced by the electric current affects the magnetization $\vec{M}$, where magnetization $\vec{M}$ may be regarded as the magnetic charge (In this case it is acceptable to assume that the magnetic charge exists at the magnetic pole).

The second term is a supplementary term to the first term and is a force produced by the action of the current on the magnetic fields $\vec{H}dem$ and $\vec{H}ext$ (where the magnetic field $\vec{H}dem$ follows the magnetization $\vec{M}$, and $\vec{H}ext$ often follows the same).

The object of this invention is to provide a magnetic memory element by which the remanent magnetization can be read out non-destructively.

Another object of this invention is to provide a magnetic memory element in which writing or storing is carried out at the neighborhood of the remanent magnetization on the hysteresis curve but reading is carried out by utilizing the force affected to the magnetized magnetic element when a current flows through the magnetized magnetic element.

This invention will be better understood by the description taken in conjunction with the drawing in which.

Referring to FIGS. 1 to 4, when an electric current I flows through a magnetized magnetic element A of any shape, said element A receives a force $\vec{F}_A$ which depends on the direction of the magnetization $\vec{M}$ of the element A. $\vec{F}_A$ is given, as shown hereinbefore, as follows;

$$\vec{F}_A = \int [(-\nabla\cdot\vec{M})\,\vec{H}_I + (\vec{i}/c) \times \vec{H}']dv \quad (7)$$

where $\vec{M}$ is the magnetization, $\vec{H}_I$ is the magnetic field produced in the element A by the current I, $\vec{i}$ is the current density in the element A, $\vec{H}'$ is equal to $(\vec{H} - \vec{H}_I)$, $H$ being the magnetic field in the element A, the direction of $\vec{H}'$ being opposite to that of the magnetization $\vec{M}$, the sign (+ or −) of $\vec{H}'$ being reversed when the magnetization $\vec{M}$ is inverted, and the units of these magnetic or electric quantity are CGS Gauss units.

In the equation (7), the first term gives the first approximation of the desired force and the second term which decreases the first term is the supplementary term to the first approximation.

Therefore, it is important to make the first term maximum and the second minimum to obtain an effective memory element. For best results, it is necessary to make the second term, $|\int (\vec{i}/c) \times \vec{H'}\, dv|$, under 50 percent of the first term $|\int(-\nabla\cdot\vec{M})\, \vec{H}\, dv|$.

The first term is equal to the magnetostatic force when assuming the existence of the magnetic charge.

Figure 1:
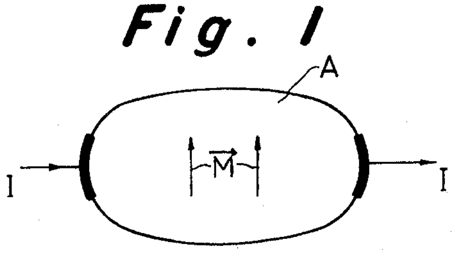
FIGS. 1 to 4 show schematically the principle of this invention.
Figure 2:
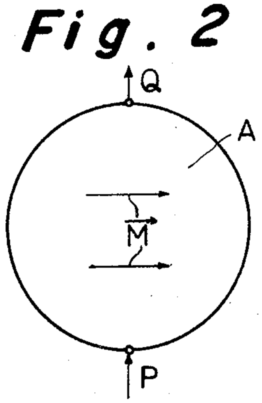

In FIG. 2, when a spheric magnetic element A has a uniform magnetization $\vec{M}$ and the current I flows through the element A, the element A is equivalent to an open magnetic circuit. In this case, the second term $\vec{H'}$ of the equation (7) is given by the following equation because of the demagnetizing field of the sphere, $$\vec{H'} = -(4/3)\,\pi\vec{M} \tag{8}$$

This value of $\vec{H'}$ is equal to two-thirds of the absolute value of the first term and hence the force $\vec{F}$ is only one-third of the first term. The force $\vec{F}$ is perpendicular to the drawing and to downwards.

Figure 3:
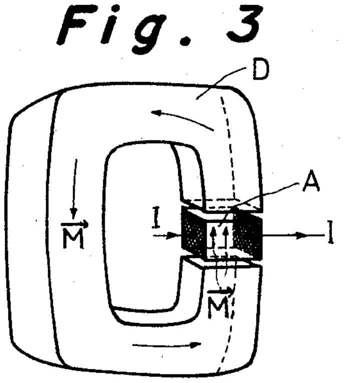

In FIG. 3, a yoke D is provided to make a closed magnetic circuit so that the magnetic field $H'$ can be reduced. The magnetic element A itself is an open magnetic circuit like in FIG. 2, but the circuit is closed by the yoke D. In this case, the magnetizations of both A and D are effective. The yoke D may be made of ferromagnetic oxides with a square loop hysteresis curve and the element A may be made of conductive magnetic metals or compounds.

By using the magnetic yoke D which is closely arranged or contacted to the element A, the magnetic field $\vec{H'}$ comes theoretically to nearly zero.

For instance, if the gap between elements A and D is $l$ and the total magnetic path through both of them is L, $$\vec{H'} = (2l/L)\,4\pi\vec{M} \tag{9}$$

If $l$ is $0.1\mu$, L is $100\mu$ and $\vec{M}$ is $5 \times 10^2$, $\vec{H'}$ is 12.6 $Oe$.

The necessary condition for making $\vec{H'}$ approach to zero is $\vec{H'} \leq \vec{Hc}$, where $\vec{Hc}$ is the lowest demagnetizing field of the elements A and D.

If the magnetic field $\vec{H'}$ can be reduced sufficiently to approach zero, the first term is completely effective and the highest force is obtained. As described hereinbefore and well-understood from the equation (9), the smaller the gap between the elements A and D, the more closely the magnetic field $\vec{H'}$ approaches zero.

If the maximum magnetic charge exists at the point where the magnetic field $\vec{H}$ is the maximum, the first term takes the maximum value, and hence the coefficient of the demagnetizing field exceeds preferably over $10^{-1}$ (CGS Gauss unit) and the shape of the magnetic element A should be a cube or the like as shown in FIG. 3.

As an example, if the magnetic element A is made of permalloy, $\vec{M}$ is $10^3$ Gauss. If the surface magnetic charge is $\sigma$, $\sigma$ is M. When the current I is 100 $m$A and the length of the side of the cube is about $2\mu$, the magnetic field $\vec{H_I}$ at the position of the magnetic charge is given by $$H_I = (2I/cr) = 2 \times 10^2\ Oe \tag{10}$$

If the area where the positive magnetic charge appears in the surface is $\Delta S$, the force is given by $$2\sigma\, H_I\cdot\Delta S \approx 1.6 \times 10^{-2}\ \text{dyne} \tag{11}$$

The force can be converted into pressure, that is, $$4 \times 10^5\ \text{dyne/cm}^2 \approx 400\ \text{gr/cm}^2 \tag{12}$$

This pressure is rather large so that it can be easily detected by a pressure gauge such as a pressure-sensitive semiconductor or diode. The direction of the pressure is reversed by a change of the direction of $\vec{M}$, and hence the pressure can be detected as information in memory.

In these cases, the electric current was shown flowing through the magnetic element A, but this is not always necessary.

Figure 4:
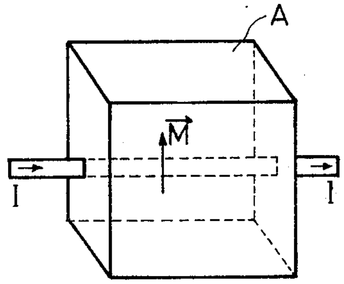

In FIG. 4, if a thin planer copper tape is inserted perpendicular to $\vec{M}$ into an insulating magnetic element A, this modification almost does not affect the total force detected.

Now, some embodiments of this invention will be described.

EXAMPLE 1

Figure 5:
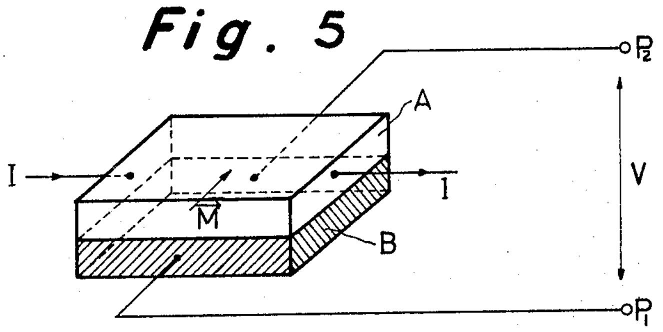
FIGS. 5 and 6 show some embodiments of this invention.

In FIG. 5, a magnetic element A of a thin metallic film is combined with a piezo dielectric element B, the element B being securably restrained on a supporting surface, not illustrated. When the electric current I flows through the element A, the force $\vec{F}$ acting on the current I affects the piezo dielectric element B in the direction perpendicular to the planer surface and a voltage of piezoelectricity is induced between terminals $P_1$ and $P_2$ which can be detected.

EXAMPLE 2

Figure 6:
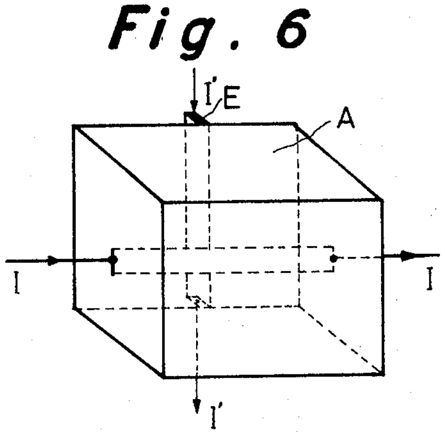

In FIG. 6, an insulating magnetic element A is combined with a pressure-sensitive semiconductor E, the element E being securably restrained on a supporting surface, not illustrated. The electric current flows along the conductive tape arranged in the magnetic element A. A pressure-sensitive semiconductor E is provided just below the conductive tape and the stationary current I' flows through the semiconductor E. The force produced on the current I affects the pressure-sensitive semiconductor E so that the resistance of the semiconductor E is abruptly changed and as a result the stationary current I' is also changed and reading is carried out by detecting the change of the current I'.

This invention relates to a memory element in which the force resulting to the magnetic element is detected by a force-detecting device. It is clear that this invention is applicable to IC memory elements. The microminiaturized element according to this invention can be easily mass-produced and the exact square loop characteristic of the material is not as critical to the operation.

What is claimed is:

1. A non-destructive readout memory device comprising a magnetized ferromagnetic element, a current path passing through the element and detecting means reacting to the Lorentz force produced in the element by the interaction between the static magnetization of the element and an electric current passing through said current path which does not alter the magnetization of the element.

2. A memory device as in claim 1, wherein said ferromagnetic element is a thin metallic film, said detecting means is a piezo dielectric element placed in contact with said thin film and wherein said current path passes through said thin film and said force induces a voltage in said piezo dielectric element.

3. A memory device as in claim 1, wherein said ferromagnetic element is an insulating magnetic element, said current path is a conductive tape passing therethrough, said detecting means is a pressure sensitive semiconductor and wherein current flows through said conductive tape and said force changes the resistance of said semiconductor.

4. A memory device as in claim 1, wherein the force is represented by the formula $$\vec{F} = \int [(-\nabla \cdot \vec{M})\, \vec{H}_I + (\vec{i}/c) \times \vec{H}']dv$$

where $\vec{M}$ is the magnetization, $\vec{i}$ is the current density, $\vec{H}_I$ is the magnetic field produced by the current $i$, $\vec{H}'$ is the remaining magnetic field after $\vec{H}_I$ is removed from the total magnetic field and $c$ is the velocity of light.

5. A memory device as in claim 4, wherein the value $$\int (\vec{i}/c) \times \vec{H}'\, dv$$

is not more than 50 percent of the value of $$\int (-\nabla \cdot \vec{M})\, \vec{H}_I\, dv$$

* * * * *